No. 609,176. Patented Aug. 16, 1898.
A. G. WOLCOTT.
TRUCK.
(Application filed Dec. 18, 1897.)
(No Model.) 2 Sheets—Sheet 1.
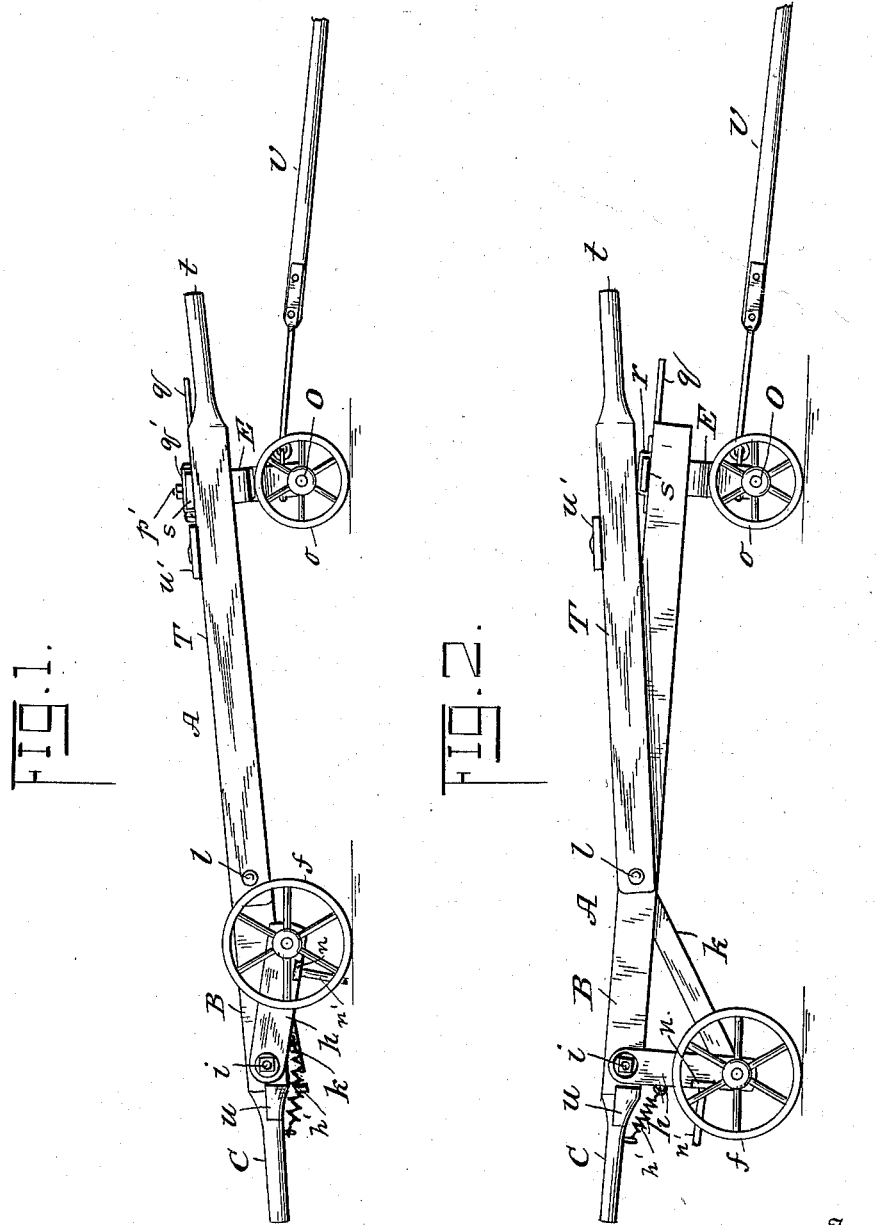
Witnesses
Sam'l R. Turner
C. C. Hines
Inventor
A. G. Wolcott.
By R.S.& A.B. Lacey,
his Attorneys No. 609,176. Patented Aug. 16, 1898.
A. G. WOLCOTT.
TRUCK.
(Application filed Dec. 18, 1897.)
(No Model.) 2 Sheets—Sheet 2.
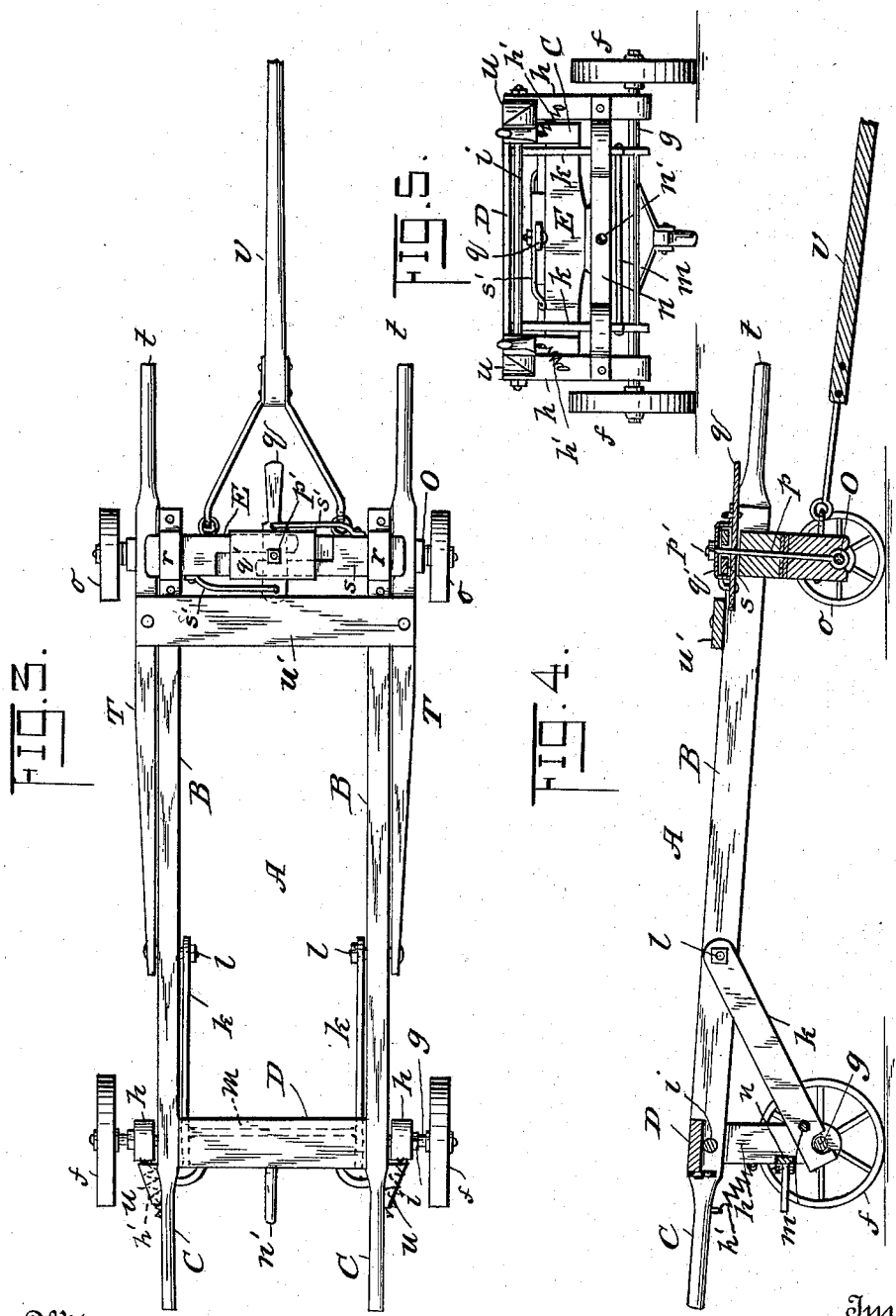
Witnesses
Sam'l R. Turner
C. C. Hines
Inventor
A. G. Wolcott.
By R. S. & A. B. Lacey.
his Attorneys
THE NORRIS PETERS CO., PHOTO-LITHO., WASHINGTON, D. C.

UNITED STATES PATENT OFFICE.

ALBERT G. WOLCOTT, OF LENOX, OHIO.

TRUCK.

SPECIFICATION forming part of Letters Patent No. 609,176, dated August 16, 1898.

Application filed December 18, 1897. Serial No. 662,442. (No model.)

*To all whom it may concern:*

Be it known that I, ALBERT G. WOLCOTT, a citizen of the United States, residing at Lenox, in the county of Ashtabula and State of Ohio, have invented certain new and useful Improvements in Trucks; and I do hereby declare the following to be a full, clear, and exact description of the invention, such as will enable others skilled in the art to which it appertains to make and use the same.

This invention relates to improvements in trucks, the object of the invention being to provide a truck for general use, but particularly for transporting stoves, which is strong, light and durable, and designed to facilitate the operation of loading, transporting, and unloading.

The detailed objects and advantages of the invention will appear in the course of the subjoined description.

In the accompanying drawings, Figure 1 is a side elevation of a truck embodying my invention. Fig. 2 is a similar view showing the rear portion of the frame and lever-arms elevated. Fig. 3 is a top plan view; Fig. 4, a central vertical longitudinal section, and Fig. 5 is a rear end elevational view.

A represents the frame of the truck, consisting of the side beams B, having their rear ends extended to form handles C, a rear cross-bar D, and front bolster E. An open frame may be employed, as shown in the present instance, or a platform may be extended between the side bars, as desired. The rear wheels $f$ are mounted on an axle $g$, carried by two swinging arms $h$, pivoted at their upper ends to a cross-bolt $i$, extending beneath the said cross-bar, the construction being such that said arms, axle, and wheels may be swung inward to lower the rear end of the frame, as shown in Fig. 1, to facilitate loading and swung outward to a vertical position, as shown in Fig. 2, to raise the rear end of the frame after loading. The parts are adapted to be firmly supported when swung outwardly by braces $k$, notched at their free ends to engage said axle and pivoted at their opposite ends on the inner sides of the beams B by the bolts $l$, passing through said beams. The braces are connected to move in unison by a cross-rod $m$, and the swinging arms $h$ are similarly connected by a cross-bar $n$, which may be provided with a handle $n'$, by which said arms may be conveniently swung inwardly to lower the rear end of the truck. Spiral springs $h'$, connecting between stop-blocks $u$ on the handles C and the said arms $h$, are provided to automatically swing the arms outwardly to raise the rear end of the truck. The function of the stop-blocks $u$ is to limit the outward movement of these arms.

The front end of the frame is mounted on an axle O, carrying wheels $o$ and swiveled by a king-bolt $p$, passed upward through the bolster and fitted with a retaining-nut $p'$. Pivoted about centrally to the king-bolt and fitted to move in a recess in the bolster is a locking-lever $q$, and above said lever is a plate $q'$, which covers the recess in the bolster. Sliding in said plate and through keepers $r$ on the side beams are bolts $s$, which are connected to the lever by links $s'$, whereby they may be projected to have their outer ends extend beyond the side beams, as shown in Figs. 2 and 3.

T represents lever-arms pivoted at one end on the exterior of the side beams to the bolts $l$ and formed at their free ends with handles $t$. These lever-arms are connected by a cross-bar $u'$ and are adapted to be turned down alongside the side beams and locked by the bolts $s$ in the manner shown in Fig. 1 or to be raised and rested on said bolts in the manner shown in Fig. 2 to support the load and prevent the latter from sliding laterally off the frame.

The operation is as follows: In loading, the rear end of the truck is brought close to the article to be moved and the arms $h$, carrying the rear axle, swung inward to lower said rear end, so that the article may be conveniently lifted onto the frame. The rear end of the frame is raised to permit the arms $h$ and rear axle to be swung outward by the springs $h'$ to maintain the said rear end of the frame in raised position, so that said frame will incline downward from rear to front and render it easier for the article to be pushed forward. Finally, the lever-arms T are raised and rested on the bolts $s$, so as to level the frame and serve as stops to prevent the load from sliding off laterally. The cross-bar $u'$ prevents the load from sliding forward, while the load is deterred from sliding rearwardly by the inclination of the frame. In unloading, the rear end of the frame is lowered to permit of the load being readily moved backward and the arms T employed as levers if desired to move said load. By detaching the front and rear axles and locking the arms T in the position shown in Fig. 1 the truck may be converted into a hand-barrow for conveniently carrying the load into and out of a store or dwelling. A tongue or handle V may be connected to the front axle for convenience in drawing the truck.

This construction of truck is especially adapted for transporting stoves from one room to another of a dwelling or from one part of a large store-room to the other, which may be accomplished without removing the legs of the stove by inserting the lowered rear end of the truck under the bottom of the stove. The bottom of the stove will then rest on the side bars B, and the legs will extend down on the outside of said bars. When the truck-frame is raised, the stove may be transported to the desired place of deposit and then unloaded by lowering the rear end of the frame in the manner hereinbefore described. By this means the stove may be loaded, transported, and unloaded without the necessity of the operator taking hold of the same, so that a heated stove may be readily and conveniently moved with safety.

From the above description, taken in connection with the accompanying drawings, the construction, mode of operation, and advantages of the truck will be apparent.

I desire it understood that changes in the form, proportion, and minor details of construction may be made without departing from the spirit or sacrificing any of the advantages of the invention.

Having thus fully described my invention, what I claim as new and useful, and desire to secure by Letters Patent, is—

1. In a wheeled truck, the combination with a frame having a rear axle adapted to be adjusted to raise and lower the rear end thereof, of pivoted lever-arms adapted to be raised to support the load and serve as levers in unloading, substantially as described.

2. In a wheeled truck, the combination with a frame having a rear axle adapted to be adjusted to raise and lower the rear end thereof, of pivoted lever-arms adapted to be raised to support the load and serve as levers in unloading, and bolts adapted to hold the lever-arms locked parallel with the frame and serve as supports for said lever-arms when the latter are raised, substantially as described.

3. In a wheeled truck, the combination with a frame, of a rear axle carrying wheels, swinging arms pivoted to the frame and carrying said axle, braces for supporting the arms in vertical position, and pivoted lever-arms adapted to be raised to support the load and to serve as levers in unloading, substantially as described.

4. In a wheeled truck, the combination with a frame, of a rear axle carrying wheels, swinging arms pivoted to the frame and carrying said axle, braces for supporting the arms in vertical position, lever-arms pivoted to the said bars of the frame and adapted to be turned down parallel with said frame and to be raised above the same, bolts on the front of the frame adapted to hold the levers when turned down, and support the same when raised, and a pivoted lever for operating said bolts, substantially as described.

In testimony whereof I affix my signature in presence of two witnesses.

ALBERT G. WOLCOTT.

Witnesses:
A. P. LAUGHLIN,
H. N. BANCROFT.